(12) United States Patent
Hildreth et al.

(10) Patent No.: US 11,931,805 B2
(45) Date of Patent: Mar. 19, 2024

(54) SELF-TERMINATING ETCHING PROCESSES FOR POST-PROCESSING OF 3D PRINTED METAL ALLOYS

(71) Applicant: Colorado School of Mines, Golden, CO (US)

(72) Inventors: Owen J. Hildreth, Lakewood, CO (US); Subbarao Raikar, Golden, CO (US)

(73) Assignee: Colorado School of Mines, Golden, CO (US)

( * ) Notice: Subject to any disclaimer, the term of this patent is extended or adjusted under 35 U.S.C. 154(b) by 128 days.

(21) Appl. No.: 17/247,275

(22) Filed: Dec. 7, 2020

(65) Prior Publication Data

US 2021/0170493 A1    Jun. 10, 2021

Related U.S. Application Data

(60) Provisional application No. 62/944,491, filed on Dec. 6, 2019.

(51) Int. Cl.
*B22F 10/43* (2021.01)
*B22F 10/62* (2021.01)
(Continued)

(52) U.S. Cl.
CPC .............. *B22F 10/43* (2021.01); *B22F 10/62* (2021.01); *B22F 10/64* (2021.01);
(Continued)

(58) Field of Classification Search
CPC .......... B22F 10/43; B22F 10/62; B22F 10/64; B22F 2301/052; B22F 2301/10;
(Continued)

(56) References Cited

U.S. PATENT DOCUMENTS

| 2017/0306501 | A1 | 10/2017 | Jeon et al. |
| 2019/0314895 | A1 | 10/2019 | Hildreth et al. |
| 2021/0138552 | A1* | 5/2021 | Hildreth .................. B28B 11/00 |

FOREIGN PATENT DOCUMENTS

| WO | WO 2017/143005 | 8/2017 |
| WO | WO 2017/143013 | 8/2017 |
| WO | WO 2018/013178 | 1/2018 |

OTHER PUBLICATIONS

Davis et al., "Chapter 1: Basic Understanding of Weld Corrosion," In Corrosion of Weldments, ASM International, 2006, retrieved from https://www.asminternational.org/documents/10192/1849770/ACFAB86.pdf, 10 pages.

(Continued)

*Primary Examiner* — Anthony M Liang
*Assistant Examiner* — Danny N Kang
(74) *Attorney, Agent, or Firm* — Sheridan Ross P.C.

(57) ABSTRACT

A process is provided to remove a selective amount of material from a metal part fabricated by additive manufacturing in a self-terminating manner. The process can be used to remove support structures and trapped powder from a metal part as well as to smooth surfaces of a 3D printed metal part. In one embodiment, selected surfaces of the metal part are treated to make the selected surfaces at least one of mechanically and chemically unstable. The unstable portion of the metal support can then be removed chemically, electrochemically, with a pressure differential, and/or through vapor-phase etching. In one embodiment, the metal part may comprise one or more of an aluminum alloy, a titanium alloy, and a copper alloy. The process can be used to modify any fluid or vapor-accessible regions and surfaces of a 3D printed metal part.

20 Claims, 8 Drawing Sheets

(51) Int. Cl.
  *B22F 10/64* (2021.01)
  *B33Y 10/00* (2015.01)
  *B33Y 40/20* (2020.01)
  *B33Y 70/00* (2020.01)

(52) U.S. Cl.
  CPC ..... *B22F 2301/052* (2013.01); *B22F 2301/10* (2013.01); *B22F 2301/205* (2013.01); *B33Y 10/00* (2014.12); *B33Y 40/20* (2020.01); *B33Y 70/00* (2014.12)

(58) Field of Classification Search
  CPC ............... B22F 2301/205; B22F 10/47; B22F 2999/00; B33Y 10/00; B33Y 40/20; B33Y 70/00; Y02P 10/25
  See application file for complete search history.

(56) References Cited

OTHER PUBLICATIONS

Hildreth et al., "Dissolvable Metal Supports for 3D Direct Metal Printing," 3D Printing and Additive Manufacturing, vol. 3, No. 2, 2016, pp. 90-97.

Izumi et al., "Sulfidation properties of TiAl-2 at.% X (X=V, Fe, Co, Cu, Nb, Mo, Ag and W) alloys at 1173 K and 1.3 Pa sulfur pressure in an H2S-H2 gas mixture," Intermetallics, vol. 8, No. 8, Aug. 2000, pp. 891-901. Abstract Only.

Lefky et al., "Dissolvable Metal Supports for Printed Metal Parts," Proceedings of the 27th Annual International Solid Freeform Fabrication Symposium—An Additive Manufacturing Conference Reviewed Paper, 2016, pp. 1604-1610.

Lefky et al., "Dissolvable Supports in Powder Bed Fusion-Printed Stainless Steel," 3D Printing and Additive Manufacturing, vol. 4, No. 1, 2017, pp. 2-11.

Lefky et al., "Impact of compositional gradients on selectivity of dissolvable support structures for directed energy deposited metals," Acta Materialia, vol. 153, Jul. 2018, pp. 1-7. Abstract only.

Izumi et al., "Sulfidation properties of TiAl-2 at.% X (X=V, Fe, Co, Cu, Nb, Mo, Ag and W) alloys at 1173 K and 1.3 Pa sulfur pressure in an H2S-H2 gas mixture," Intermetallics, vol. 8, No. 8, Aug. 2000, pp. 891-901.

Lefky et al., "Impact of compositional gradients on selectivity of dissolvable support structures for directed energy deposited metals," Acta Materialia, vol. 153, Jul. 2018, pp. 1-7.

Official Action for U.S. Appl. No. 17/697,814, dated Mar. 27, 2023, 7 pages. Restriction Requirement.

Official Action for U.S. Appl. No. 17/697,814, dated Sep. 13, 2023, 12 pages.

* cited by examiner

SELF-TERMINATING ETCHING PROCESSES FOR POST-PROCESSING OF 3D PRINTED METAL ALLOYS

CROSS-REFERENCE TO RELATED APPLICATIONS

This application claims priority under 35 U.S.C. § 119(e) to U.S. Provisional Patent Application Ser. No. 62/944,491 filed Dec. 6, 2019, which is incorporated herein in its entirety by reference.

GOVERNMENT LICENSE RIGHTS

This invention was made with government support under Contract Nos. N000376409, N000293273, and N000293273 awarded by the Department of Energy through the Kansas City National Security Center. The government has certain rights in the invention.

FIELD

This disclosure relates to additive manufacturing and, more specifically, to processes for fabricating a metal part by additive manufacturing and for removing a selective amount of material from the metal part.

BACKGROUND

Additive manufacturing of metal parts is projected to be a $10 billion to $20 billion per year industry by 2025. However, metal parts fabricated by additive manufacturing require a significant amount of post-production processing. Post-production processing is expensive and accounts for 30% to 70% of the cost of metal parts produced by additive manufacturing. Current processes for finishing metal parts produced by additive processing also add unwanted complexity to the design and fabrication of 3D printed metal parts, limiting the unprecedented design freedom offered by additive manufacturing.

For example, a metal part fabricated by additive manufacturing typically includes support structures that must be removed. Traditional, monolithic support structures are made from the same material as the metal part. Machining operations are used to remove the support structures from the metal part. The machining operations add significant expense to the cost of the metal part.

The design of the metal part is also limited due to the post-production machining operations. More specifically, the metal part must be designed so that the support structures are accessible to tools or workers for removal from the metal part during post-production processing. This accessibility requirement limits the types of shapes that can be fabricated by additive manufacturing. In addition, features may need to be fabricated on or added to the metal part or the support structure for the metal part to be held and manipulated while support structures are being removed.

Post-production processing of a 3D printed metal part can also include removing metal powder used in the additive manufacturing process that is trapped within an internal space of the metal part. Removing the trapped metal powder can be very difficult. For example, it may be difficult to access the internal space of the metal part that includes trapped metal powder.

Surfaces of the metal part may also need to be smoothed during post-production processing. Traditionally, processes such as machining, bead blasting, sand blasting, and vibratory mechanical polishing have been used to finish metal parts fabricated by additive manufacturing. However, these processes have several deficiencies. None of these processes are self-terminating and may inadvertently remove more of the metal part than intended or necessary. Moreover, these processes can also damage the metal part and cannot remove supports and trapped powder from internal features.

Accordingly, there is an unmet need for a process for finishing a metal part fabricated by additive manufacturing that can reduce or eliminate the cost and deficiencies of traditional post-production processing methods and thus reduce capital expenditures and design limitations imposed by traditional post-production processing methods. There is also a need for a simplified method of post-production processing of a metal part fabricated by additive manufacturing that does not sacrifice integrity of the metal part.

SUMMARY

The above shortcomings and other needs are addressed by the various embodiments and configurations of the present disclosure. It is an objective of the present disclosure to provide a process for changing the composition of an outer layer of a material and then dissolving the layer to separate a support from a part, to condition a surface of the part, or to impose other physical effects on the part. As a result, the design possibilities for additive manufacturing and the arrangement of part materials and support materials are greatly expanded since the structures need to be only fluid accessible for post processing, rather than machine accessible. In addition, processes of the present disclosure can reduce the costs of post-production processing of metal parts formed by 3D printing by 90% to 99% while reducing post-processing time by weeks or even months. Use of the post-production processing systems and processes described herein can save the industry $5 billion to $10 billion per year.

One aspect of embodiments of the present disclosure is to provide a process to sensitize a part and/or support with a sensitizing agent to create a sensitized region in the part and/or support. The sensitized region is less stable, chemically or mechanically, than the remaining part or support such that a subsequent action can remove all or most of the sensitizing region without negatively affecting the remaining part. Materials such as aluminum, copper, and titanium are extremely passivating, or resistant to corrosion, and forming, for example, carbides in an outer layer of these materials would not substantially impact the corrosion resistance of these materials. Thus, forming carbides would not allow the outer layer to readily dissolve or otherwise be removed in a subsequent action. As described in detail below, the selection of the sensitizing agent is critical to create the sensitized region with a particular composition. In one exemplary embodiment, a titanium material is coated with a sulfur sensitizing agent that creates an outer layer with titanium disulfide ($TiS_2$), which is soluble in a dilute and concentrated acid.

It is a further aspect of embodiments of the present disclosure to provide a process to apply an etchant or other agent to dissolve the sensitized region. As described in detail below, the selection of the etchant is also critical to dissolve the sensitized region but not the remaining part. With the selection of an etchant, the dissolving process is self-terminating where the etchant will dissolve the sensitized region, which can mean the sensitized region is dissolved up to a transition region or up to a remaining, unsensitized portion of the part material or support material. Then, the process is self-terminating where the etchant either does not dissolve any further material or only dissolves further material at a lesser rate such that the etchant can be rinsed away. In one exemplary embodiment, a copper or aluminum material has a sensitized region with a magnesium component, and the sensitized region can be dissolved by an etchant such as sodium chloride (NaCl), hydrogen chloride (HCl), other chloride-containing solutions, or acids.

It is an aspect of embodiments of the present disclosure to provide a product made from additive manufacturing that has a part held in place by one or more supports made from the same material as the part. In this embodiments, the processes that produce a sensitized region can be applied to all materials, just a connection between the part and the supports, or the supports themselves. In other embodiments, the support is made from a different material than the part such that a sensitized region is selectively produced, for example, on only the support such that an etchant dissolves only the support to separate the part from the support. Supports can be made from nonmetals such as silicon dioxide ($SiO_2$) and incorporated into the part material such as other oxides or metals. An adhesion promoter, such as titanium (Ti) or chromium (Cr), may be used to help incorporate silicon dioxide into metals. In various embodiments, the supports can have a dissolvable microstructure and, optionally, the supports can include a mechanically weak microstructure.

It is another aspect of embodiments of the present disclosure to provide a part and a plurality of supports where the supports can be dissolved in a sequence. Multiple types of supports or sacrificial sections can be formed when the part is 3D printed. For example, a first support comprising a first material can be sensitized with a first sensitizing agent. The first support can then be removed, for example, by dissolving in a first etching bath.

A second support comprising a second material can be sensitized with a second sensitizing agent. Thereafter, the second support can be removed from the metal part, for example, by dissolving in a second etching bath. In this manner, the supports can be selectively removed from the part while other portions of the part are left for metrology, machining, fixturing, or other process.

The process may also include forming supports with different strengths when the metal part is 3D printed. In one embodiment, this includes forming supports with shapes that are less stable. For example, a first support may have a cross-sectional dimension, or separation dimension as described in detail below, that is smaller than a second support. Accordingly, after surfaces of the first and second supports have been sensitized, the first support can be dissolved or etched away faster than the second support. In this manner, the first support can be removed and then the removal process can be stopped before the second support is removed. The second support can thus be left in place for some mechanical or structural advantage.

The systems and processes of the present disclosure can apply to a variety of materials such as most metals, oxides, semiconductors, and plastics. A "leeching" or sensitizing agent can be applied as a slurry (particles in liquid), liquid (e.g., iron carbonyl that decomposes to iron and carbon monoxide under heat), chemical salt (solid, aqueous, non-aqueous), chemical solution, or gas. Degradation mechanisms include but are not limited to leeching, precipitate forming, grain boundary attach/weakening, intra-grain attach, dissolution, alloying, intermetallic alloying, and more. Processes to remove the weakened region include, but are not limited to, chemical dissolution, electrochemical dissolution, thermal evaporation, thermal stressing, thermal cracking, stress corrosion cracking, mechanical strain, mechanical deformation, sanding, sand (or bead) blasting, etc.

One particular embodiment of the present disclosure is a process for separating a support from a part, comprising (i) joining the part and the support at a connection that has a separation dimension from an outer perimeter of the connection; (ii) applying a sensitizing agent to the part and the support proximate to the connection; (iii) heating the part and the support at an elevated temperature to cause the sensitizing agent to diffuse into the part and the support and create a sensitized region, wherein the sensitized region has a depth that is greater than or equal to the separation dimension; and (iv) applying an etchant to the sensitized region to dissolve the sensitized region through the separation dimension to separate the support from the part.

In some embodiments, the part and the support at least partially comprise one of an aluminum material and a copper material, the sensitizing agent at least partially comprises a magnesium material, and the etchant at least partially comprises a chloride material. In various embodiments, the part and the support at least partially comprise a titanium material, the sensitizing agent at least partially comprises a sulfur material, and the etchant at least partially comprises at least one of sulfuric acid and sodium molybdate. In some embodiments, the part and the support at least partially comprise a copper material, the sensitizing agent at least partially comprises a sulfur material, and the etchant at least partially comprises at least one of nitric acid and 3-amino-1,2,4-triazole.

In various embodiments, the connection has a cross section with a circular shape, and the separation dimension is a radius of the circular shape. In some embodiments, applying the etchant is a self-terminating process such that only the sensitized region is dissolved or a rate of dissolution decreases after the sensitized region is dissolved. In various embodiments, the method further comprises (v) joining the part and a second support at a second connection that has a second separation dimension from an outer perimeter of the second connection, wherein the second separation dimension is larger than the separation dimension, and the sensitized region has a depth that is greater than or equal to the second separation dimension such that dissolution of the sensitized region separates the second support from the part. In some embodiments, at least one of the elevated temperature, a time period for the heating, and a time period for the etching is increased to increase the depth of the sensitized region.

Another particular embodiment of the present disclosure is a self-terminating process for removing a sensitized region of a material, comprising (i) applying a sensitizing agent to a surface of the material, wherein the material comprises one of an aluminum material and a copper material; (ii) heating the material at an elevated temperature between approximately 125 and 400° C. to cause the sensitizing agent to diffuse into the material and create the sensitized region in the material adjacent to the surface; and (iii) applying an etchant to the sensitized region to dissolve and remove the sensitized region of the material.

In some embodiments, the heating is conducted for between approximately 0.25 to 1.5 hours. In various embodiments, the sensitizing agent comprises one of magnesium and sulfur. In some embodiments, the etchant is a mixture of 2 M nitric acid and 3-amino-1,2,4-triazole. In various embodiments, the material is a part and a support joined at a connection having a separation dimension from an outer perimeter of the connection, wherein the sensitized region has a depth that is greater than or equal to the separation dimension. In some embodiments, the method further comprises (iv) providing a chemical bath for at least one of the applying the sensitizing agent and apply the etchant.

A further particular embodiment of the present disclosure is a self-terminating process for removing a sensitized region of a material, comprising (i) applying a sensitizing agent to a surface of the material, wherein the material comprises a titanium material, and the sensitizing agent comprises sulfur; (ii) heating the material at an elevated temperature between approximately 750 and 1150° C. to cause the sensitizing agent to diffuse into the material and create the sensitized region in the material adjacent to the surface, wherein the sensitized region is enriched with sulfur; and (iii) applying an etchant to the sensitized region to dissolve and remove the sensitized region of the material.

In some embodiments, the titanium material is Ti-6Al-4V, and the sensitized region comprises at least one of titanium disulfide (TS2) or a titanium-depleted material. In various embodiments, the heating is conducted for between approximately 4 to 36 hours. In some embodiments, the sensitized region has a depth between approximately 10 and 200 μm. In various embodiments, the etchant is a mixture of 5M sulfuric acid and 0.5M sodium molybdate. In some embodiments, the material is a part and a support joined at a connection having a separation dimension from an outer perimeter of the connection, wherein the sensitized region has a depth that is greater than or equal to the separation dimension.

Another specific embodiment of the present disclosure is a substrate made from 3-D printing or additive manufacturing, comprising a part connected to a support at a connection that has a separation dimension from an outer perimeter of the connection; a sensitizing agent applied to an outer surface of the part and the support such that the sensitizing agent creates a sensitized region in the part and the support, wherein the sensitized region has a depth greater than or equal to the separation dimension such that application of an etchant to the sensitized region dissolves the sensitized region through the separation dimension to separate the support from the part.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements or components. Additional aspects of the present disclosure will become more readily apparent from the Detailed Description, particularly when taken together with the drawings.

The above-described embodiments, objectives, and configurations are neither complete nor exhaustive. As will be appreciated, other embodiments of the disclosure are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and claims themselves.

BRIEF DESCRIPTION OF THE DRAWINGS

The accompanying drawings, which are incorporated in and constitute a part of the specification, illustrate embodiments of the disclosure and together with the Summary given above and the Detailed Description of the drawings given below, serve to explain the principles of these embodiments. In certain instances, details that are not necessary for an understanding of the disclosure or that render other details difficult to perceive may have been omitted. It should be understood, of course, that the disclosure is not necessarily limited to the particular embodiments illustrated herein. Additionally, it should be understood that the drawings are not necessarily to scale.

Figure 1A:
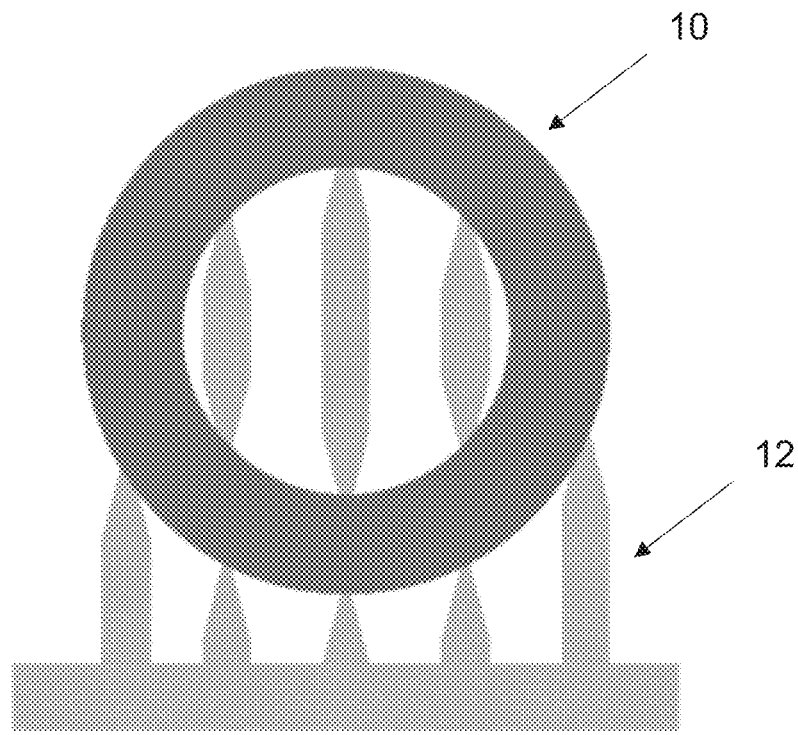
FIG. 1A is a side view of a part and a support created by additive manufacturing or three dimensional (3D) printing according to the prior art.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
|--------|-----------|
| 10 | Part |
| 12 | Support |
| 14 | Connection |
| 16 | Separation Dimension |
| 18 | Sensitizing Agent |
| 20 | Sensitized Region |
| 22 | Part |
| 24 | Boundary Region |
| 26 | Aluminum Rich Region |
| 28 | Sensitized Region |

DETAILED DESCRIPTION

The present disclosure has significant benefits across a broad spectrum of endeavors. It is the Applicant's intent that this specification and the claims appended hereto be accorded a breadth in keeping with the scope and spirit of the disclosure being disclosed despite what might appear to be limiting language imposed by the requirements of referring to the specific examples disclosed. To acquaint persons skilled in the pertinent arts most closely related to the present disclosure, a preferred embodiment that illustrates the best mode now contemplated for putting the disclosure into practice is described herein by, and with reference to, the annexed drawings that form a part of the specification. The exemplary embodiment is described in detail without attempting to describe all of the various forms and modifications in which the disclosure might be embodied. As such, the embodiments described herein are illustrative, and as will become apparent to those skilled in the arts, may be modified in numerous ways within the scope and spirit of the disclosure.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present disclosure are described herein and as depicted in the drawings. It is expressly understood that although the figures show parts, supports, and systems and processes for processing the same, the present disclosure is not limited to these embodiments. It will be appreciated that terms such as "comprising aluminum" refer to materials with a composition that has some amount of aluminum such as pure aluminum, an aluminum alloy, etc., terms such as "comprising copper" refer to materials with a composition that has some amount of copper such as pure copper, a copper alloy, etc., and terms such as "containing titanium" refer to materials such as pure titanium, a titanium alloy, etc. This also applies to other materials described herein such as sensitizing agents, etchants, etc. For example, terms such as "comprising sulfur" can include substances such as element sulfur flakes, nickel sulfide, sulfuric acid, $H_2S$, sulfates, $H_2SO_4$, sulfides, etc. Moreover, terms such as "aluminum", "aluminum material", and "aluminum alloy" can be used interchangeably herein, terms such as "copper", "copper material", and "copper alloy" can be used interchangeably herein, and the terms "titanium", "titanium material", and "titanium alloy" can be used interchangeably herein. Terms such as "comprises" can mean that a component such as a part, support, sensitizing agents, etchant, etc. at least partially comprises a particular material.

Figure 1B:
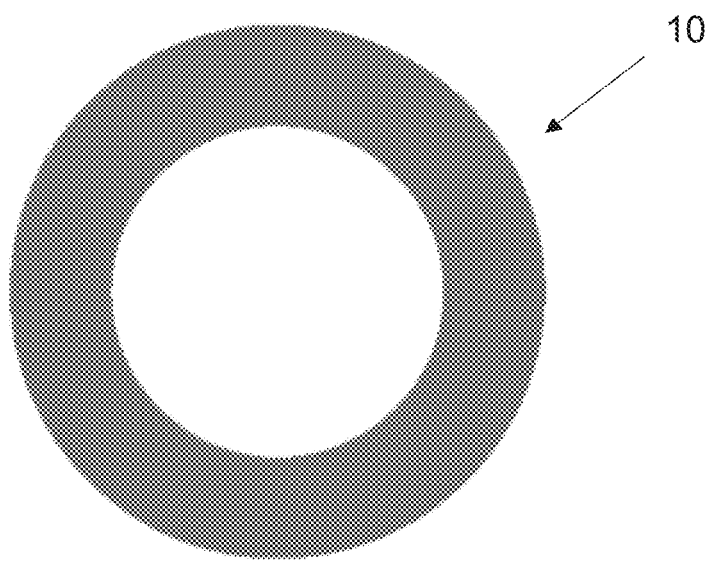
FIG. 1B is a side view of the part in FIG. 1A with the support machined away according to the prior art.

Now referring to FIGS. 1A and 1B, side views of a prior art part 10 and support 12 are provided. In FIG. 1A, the part 10 and support 12 can be additively manufactured where the part 10 is intended to be the final product or device, and the support 12 helps maintain the overall structure of the part 10 as the part 10 and support 12 are manufactured and then allowed to cool. After manufacturing and cooling, the supports 12 are then machined off, cut away, or otherwise removed to leave the part 10 as the final product or device. As discussed above, the tools and machines needed for removing the supports 12 constrain the design of the product since they need access to the supports 12.

Figure 2A:
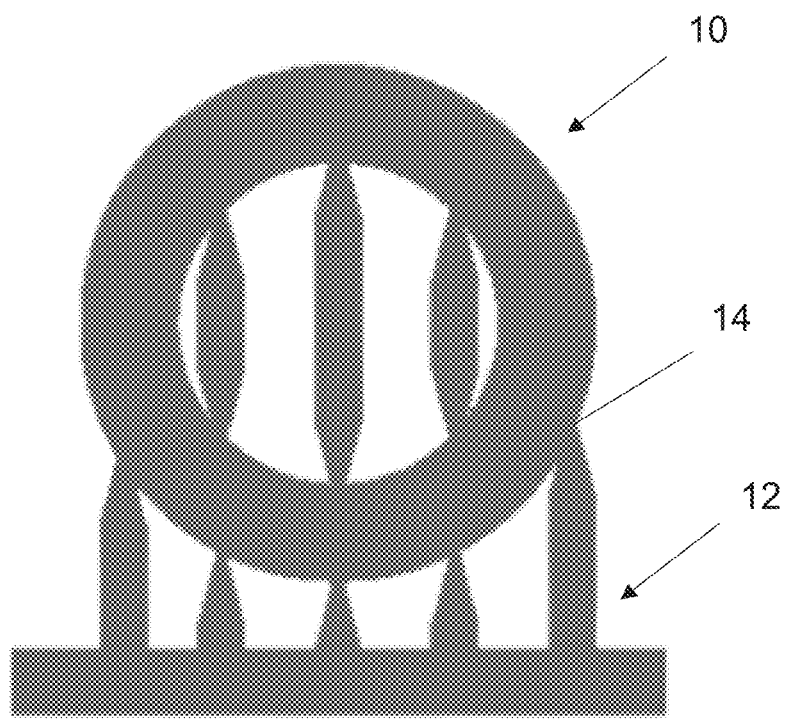
FIG. 2A is a side view of a part and a support in accordance with an embodiment of the present disclosure.

Now referring to FIG. 2A, a side view of a part 10 and support 12 are provided. The part 10 and support 12 can be additively manufactured in a range of configurations and designs that exceed what is possible according to prior art processes due to the above-noted constraints. Additive manufacturing can be performed by a 3D printer, and the process can include powder bed sintering, selective laser sinter, selective laser melting, directed energy deposition, etc. The part 10 can be any material that benefits from the disclosure herein. For exemplary purposes, the part 10 in various embodiments can be an aluminum material or alloy, a copper material or alloy, or a titanium material or alloy. The process for removing the supports 12 is tailored to the specific type or material or alloy as described in further detail below.

Figure 2B:
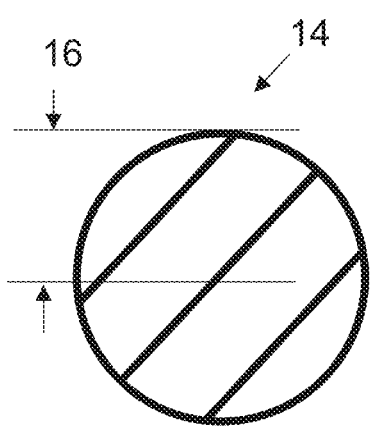
FIG. 2B is a cross-sectional view of a connection between a part and a support in accordance with an embodiment of the present disclosure.
Figure 2C:
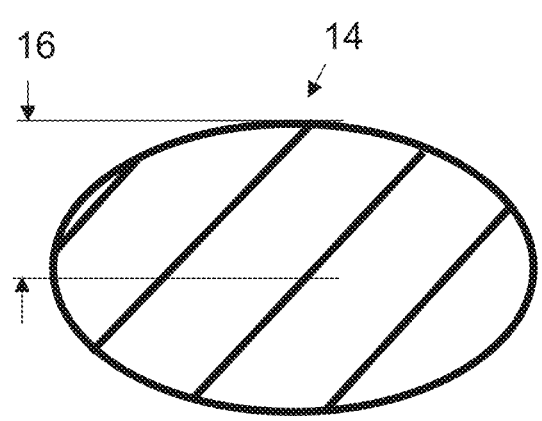
FIG. 2C is a cross-sectional view of another connection between a part and a support in accordance with an embodiment of the present disclosure.
Figure 2D:
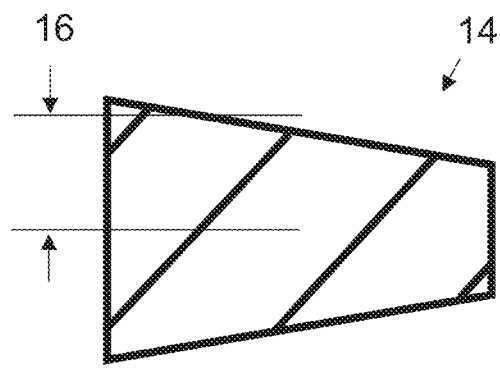
FIG. 2D is a cross-sectional view of a further connection between a part and a support in accordance with an embodiment of the present disclosure.

Now referring to FIGS. 2B-2D, cross-sectional views of a connection 14 between the part 10 and the support 12 are provided. As shown, a cross section of a given connection 14 can be characterized by a separation dimension 16, which is the dimension or depth from an outer perimeter of the connection 14 that a sensitized region needs to extend such that dissolution of the sensitized region causes a compete separation of the part 10 and the support 12. An etchant is applied to the outer perimeter to dissolve the sensitized region, and the etchant moves inwardly from all sides. Thus, for a connection 14 with a circular cross section, like the one shown in FIG. 2B, the etchant reaches the center of the circular cross section of the connection 14 from all sides simultaneously. As a result, the etchant needs to dissolve to a depth equal to a radius of the circular shape, and the separation dimension 16 is equal to the radius of the circular shape.

In FIG. 2C, the separation dimension 16 is the smallest radius of the oval cross-sectional shape. Again, in the case where the entire perimeter of the connection 14 is sensitized, and the etchant is applied to the outer perimeter of the connection 14 and works inward, the etchant only needs to work to the identified dimension 16 before the connection 14 is severed. Etchant that works from the left and right sides need not meet at any point within the cross section because etchant working from the top and bottom sides will meet first and sufficiently dissolve the connection 14.

FIG. 2D shows a connection 14 with a trapezoidal cross sectional shape, and the separation dimension 16 is smaller than half of a length of the left edge of the shape. This is because the etchant dissolves from the top and bottom sides as well as the left side. Accordingly, etchant dissolving from the top left corner and bottom left corner do not need to meet at a midpoint on the left side to dissolve the connection. Rather, the etchant from the top and bottom sides meet the etchant from the left side at a "triple" point that is offset from the left edge to establish the separation dimension 16. Hence, the separation dimension 16 is not half the length of the left edge, but some dimension smaller. The geometric principle of a separation dimension 16 can apply to other components such as a portion of a part or a support.

When a part and various supports are created or printed by, for example, a 3D printer, the geometry of the part and supports is known, and a separation dimension 16 can be determined for each connection between the part and a support or for each support. Then, parameters of the process described herein such as time in a bath of sensitizing agent, time spent at an elevated temperature, the elevated temperature itself, time in a bath of etchant, etc. can be adjusted such that the largest separation dimension 16 is dissolved through and completely separated but no further material is dissolved. Embodiments of the present disclosure also consider that a connection or support can vary in cross-sectional shape along a length of the connection or support. Thus, a goal is first established such as dissolving enough material to separate the part and support or to completely eliminate any connection and support. Then, with the geometries of the connection and supports known, the parameters of the process can be set to achieve the established goal.

In an exemplary embodiment, the geometries of the various connections between the part and the supports are characterized and separation dimensions are established. One connection has a cross sectional shape with a first separation dimension, and another connection has a cross sectional shape with a larger, second separation dimension. The parameters of the process are adjusted and keyed to the second separation dimension to ensure that all connections are completely dissolved through and all supports are separated from the part.

Figure 3A:
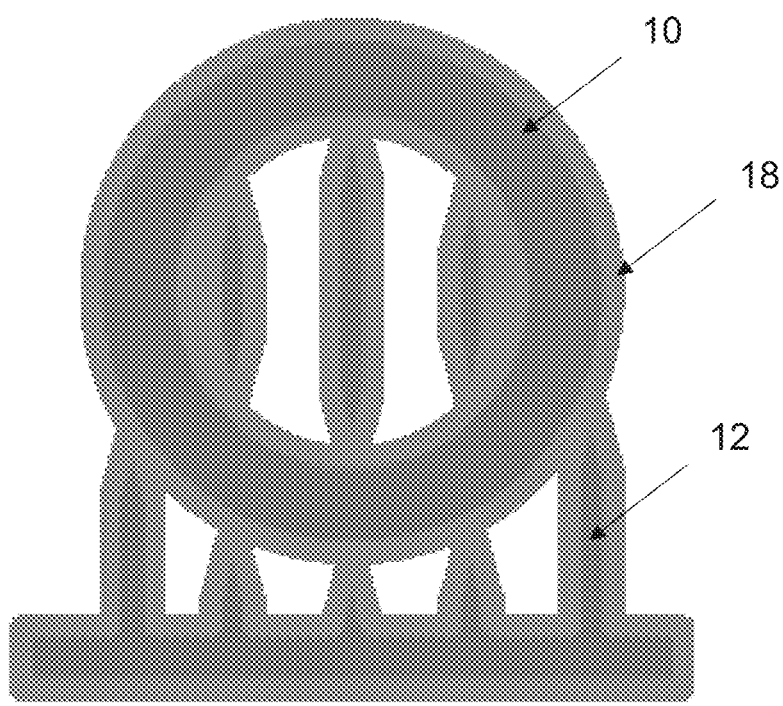
FIG. 3A is a side view of the part and the support of FIG. 2A with a sensitizing agent applied in accordance with an embodiment of the present disclosure.

Now referring to FIGS. 3A-3E, various actions that can be performed in an exemplary process of the present disclosure are provided. In FIG. 3A, a sensitizing agent 18 is applied to the part 10 and support 12. In the depicted embodiment, the sensitizing agent 18 is applied over the entire surface of the part 10 and the support 12. However, in other embodiments, the sensitized agent 18 is applied to only a portion of the part 10 and/or support 12 such as the outer surface of the connection between the part 10 and the support 12. In one embodiment, a masking or blocking agent is applied to protect a portion of the surface of the metal part from the sensitizing agent. The sensitizing agent treats, leeches, degrades, weakens, or otherwise alters the composition of the part 10 and the support 12.

Figure 3B:
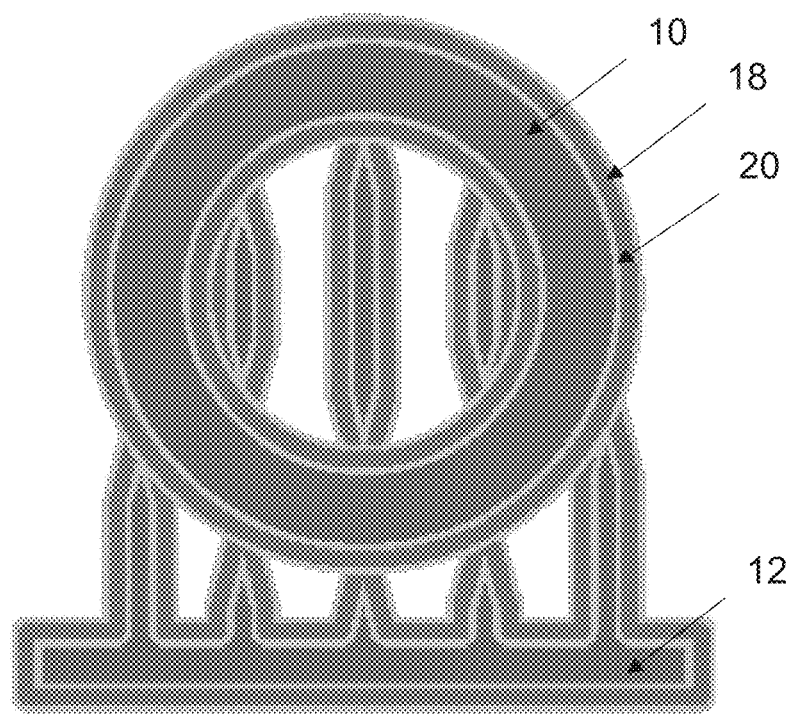
FIG. 3B is a side view of the part and the support of FIG. 3A with a heat treatment to create a sensitized region in accordance with an embodiment of the present disclosure.

Referring to FIG. 3B, the part 10 and the support 12 along with the sensitizing agent 18 are subjected to a heat treatment process. This process can serve to both create a sensitized region and also relieve stresses and refine microstructure in the part material. In some embodiments, the part 10 and support 12 are placed in an oven or other enclosed space with an elevated temperature for a predetermined time period. This heat treatment causes the sensitizing agent 18 to change the composition of the surface of the part 10 and support 12 to create a sensitized region 20 that has a different composition compared to the rest of the part 10 and support 12. It will be appreciated that the actions described herein can be performed in any order and in series or in parallel. For instance, the sensitizing agent 18 can be applied to the part 10 and support 12 while in the oven.

Figure 3C:
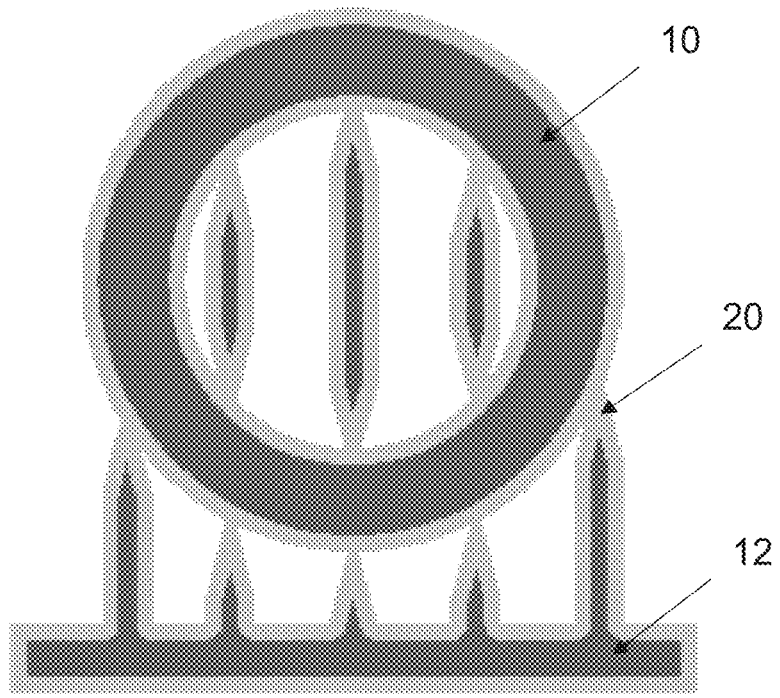
FIG. 3C is a side view of the part and the support of FIG. 3B with the sensitizing agent removed leaving the sensitized region in accordance with an embodiment of the present disclosure.

Referring to FIG. 3C, a side view of a part 10 and support 12 is provided where the part 10 and support 12 have been removed from an oven and excess sensitizing agent has been rinsed away. The resulting part 10 and support 12 have a sensitized region 20 as described above. In some embodiments, the sensitized region 20 has a depth such that at least one cross-sectional portion of the connection between the part 10 and support 12 is completely sensitized, and thus, completely dissolved. The depth of the sensitized region 20 can be characterized in a number of ways. For instance, the depth can be described in terms relative to the physical size of the connection including a separation dimension of the connection as described above. As the sensitizing region 20 needs to extend completely through the connection in some embodiments, the depth of the sensitizing region 20 can be greater than or equal to the separation dimension of the connection.

Figure 3D:
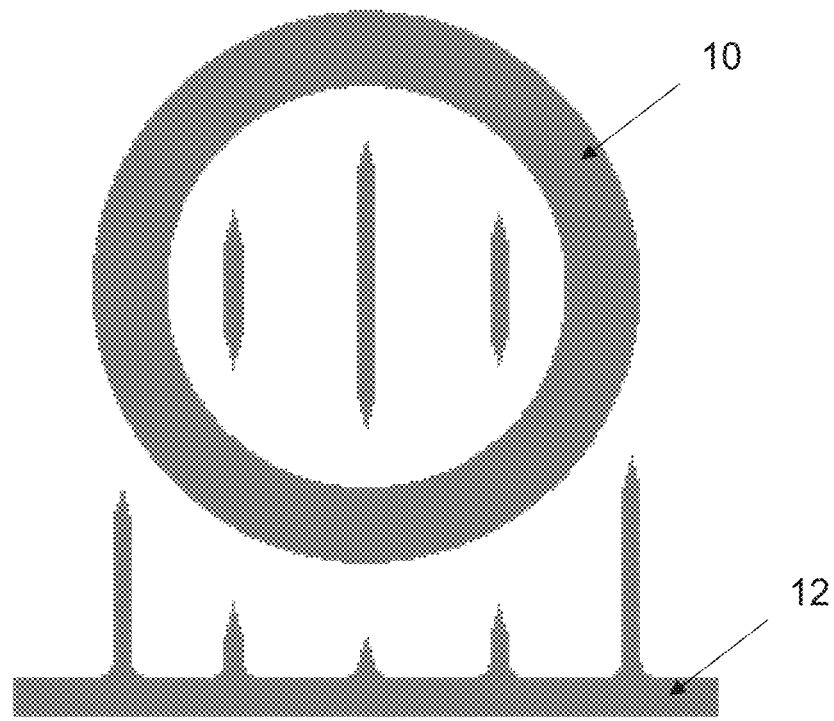
FIG. 3D is a side view of the part and the support of FIG. 3C with an etchant applied that dissolves the sensitized region and the connection between the part and the support in accordance with an embodiment of the present disclosure.
Figure 3E:
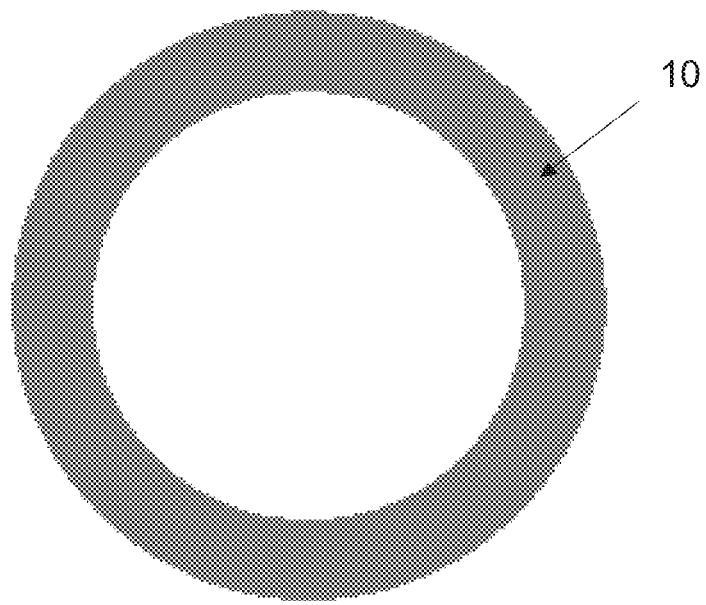
FIG. 3E is a side view of the part in FIG. 3D with the etchant rinsed away leaving only the part in accordance with an embodiment of the present disclosure.

Referring to FIG. 3D, a side view of the part 10 and support 12 is provided where an etchant has been applied to the part 10 and support 12. The etchant is selected to dissolve the sensitized region 20 but not the remaining part material 10, or at least not at the same rate. The result is that the sensitized region 20 in the connection is dissolved such that the support 12 is separable from the part 10. Thus, the designs for the part 10 and the support 12 can be much more complex as the design need to allow only chemicals to react at the connections between the part 10 and the support 12 rather than entire machines. FIG. 3E shows the part 10 with the etchant rinsed away to produce the final product.

Optionally, additives, chelating agents, complexing agents, accelerating agents, and/or inhibiting agents can be added to a chemical bath to promote dissolution of a sensitized portion of the metal part. In one embodiment, additives, chelating agents, complexing agents, accelerating agents, and/or inhibiting agents can be added to the chemical bath to increase the solubility of the sensitized portion of the part. Further still, additives or other materials can be added to the sensitizing agent to increase the passivity of a part material and/or decrease passivity of a support material. In one embodiment, the sensitizing agent is a leeching agent. Optionally, the sensitizing agent can be a fluid. The sensitizing agent may include an electrolyte. The sensitizing agent may also include complexing agents. Optionally, the sensitizing agent is a chemical solution or a gas. The sensitizing agent can be applied to the metal part in a solid phase, a liquid phase, or a vapor phase. Optionally, the sensitizing agent includes Group 1 elements and/or Group 2 elements. Additionally, or alternatively, in one embodiment the sensitizing agent includes Group 16 elements such as oxygen, sulfur, selenium, and tellurium.

Figure 4A:
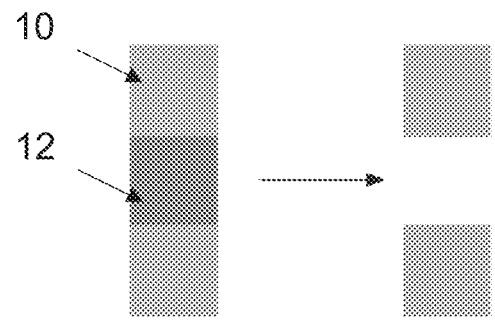
FIG. 4A is a side view of a part and support in accordance with an embodiment of the present disclosure.
Figure 4B:
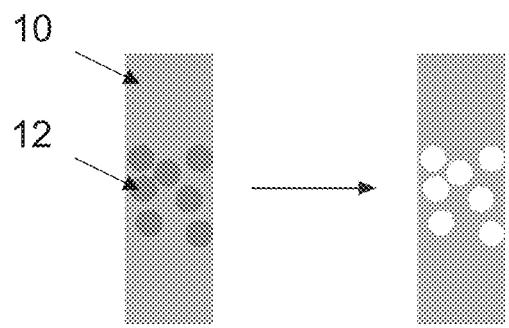
FIG. 4B is a side view of another part and support in accordance with an embodiment of the present disclosure.
Figure 4C:
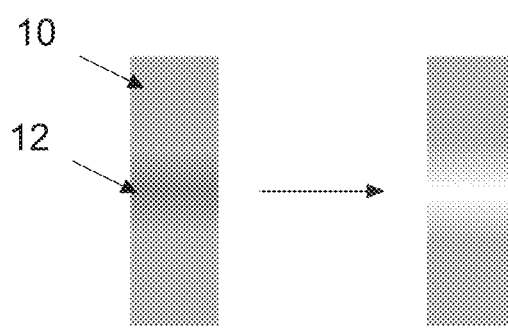
FIG. 4C is a side view of a further part and support in accordance with an embodiment of the present disclosure.
Figure 4D:
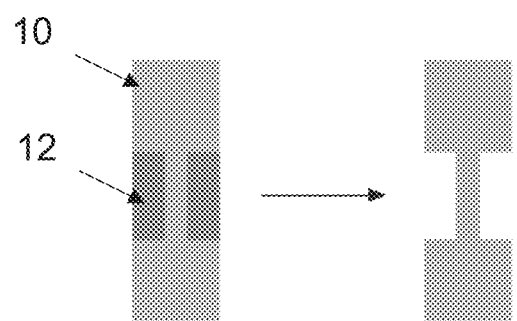
FIG. 4D is a side view of yet another part and support in accordance with an embodiment of the present disclosure.

Referring to FIGS. 4A to 4D, various types of interfaces between the part material 10 and the support material 12 are provided. These embodiments show a part 10 and a support 12 where the support 12 has a composition that is less stable, or modified by a process described herein to be less stable, than the part 10 such that an etchant will dissolve the support 12. FIG. 4A shows a uniform support 12 that is completely dissolvable. FIG. 4B shows a support 12 that is present in discrete portions, and the remaining part material 10 has a porous structure that can serve a variety of purposes. FIG. 4C is a gradient dissolvable support 12 where the interface gradually changes in composition between the part 10 and the support 12 to impart beneficial material properties (strength, coefficient of thermal expansion, modulus, chemical purity, chemical resistance, etc.). The gradient also prevents the sensitizing agent from diffusing into part 10. FIG. 4D shows a part remnant support 12 where a portion of the part 10 remains intact after an etchant is applied to dissolve the support 12, and the portion can serve as a location for chemical, mechanical, and/or alloying purposes.

Figure 5:
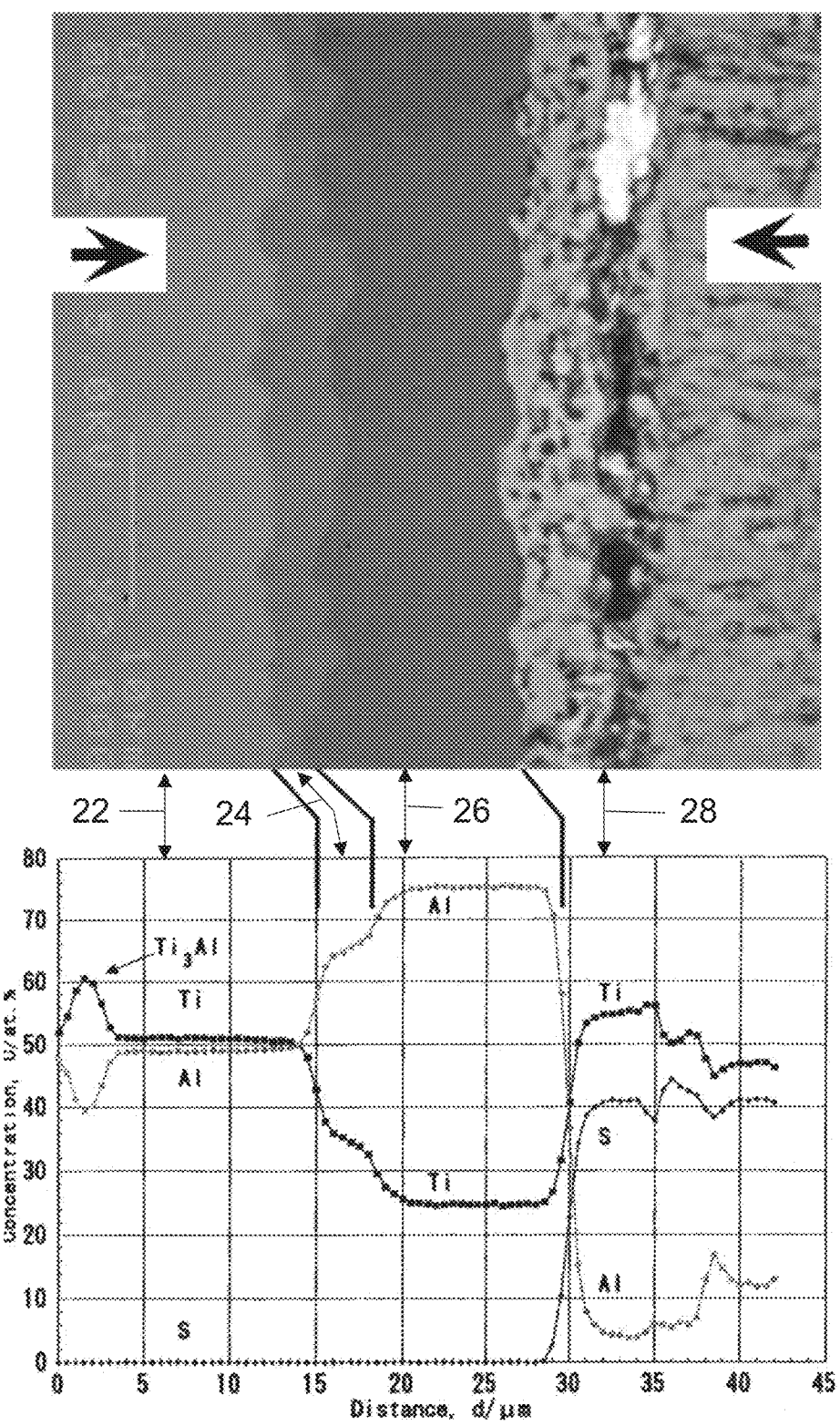
FIG. 5 is a cross-sectional view of an exemplary part that has been sensitized in accordance with an embodiment of the present disclosure.
Figure 6:
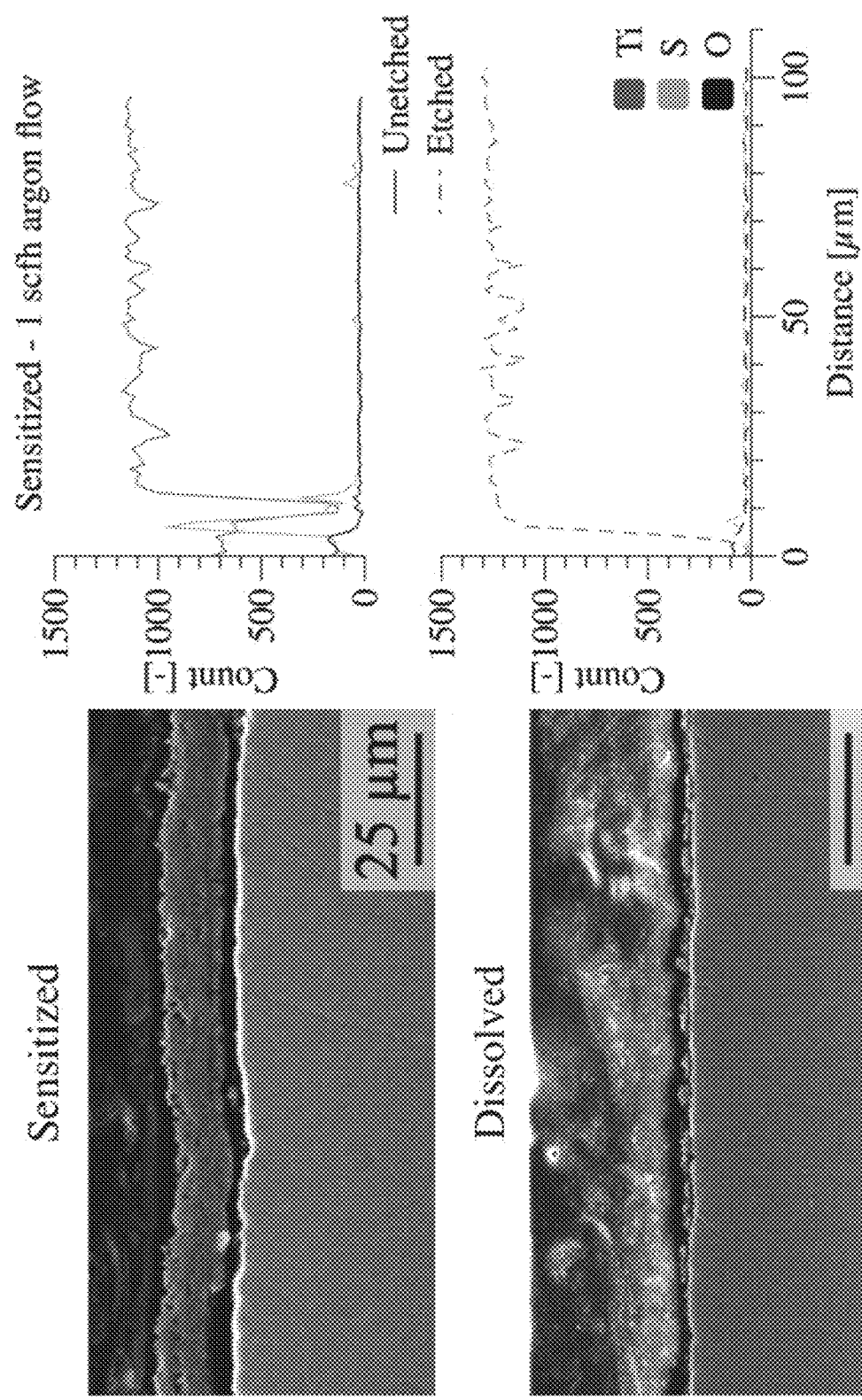
FIG. 6 is a cross-sectional view of an exemplary part that has a sensitized region that is then dissolved in accordance with an embodiment of the present disclosure.

Referring to FIGS. 5 and 6, specific examples of processes of the present disclosure applied to a titanium alloy are provided. FIG. 5 shows a cross-section of a surface of a titanium alloy, $TiAl_2$, that has been subjected to a sensitizing agent, in this case a sulfur-based sensitizing agent. The bottom of FIG. 5 shows the varying compositions in the different regions of the surface of the titanium alloy. For instance, the part material 22 of the titanium alloy shown on the left has substantially equal amounts of titanium and aluminum. Then, the composition moves to a transition region 24 and then to an aluminum rich region 26. Finally, the surface of the alloy is a sensitized region 28 that is aluminum lean and also has sulfur. As described herein, the sensitized region 28 is more unstable than the other regions, and an etchant can be selected to dissolve the sensitized region 28 while not affect, or substantially affecting, the part material of the titanium alloy.

In some embodiments, an interface material is added between the dissolvable support and the part material to promote adhesion, mechanical compliance, or other properties necessary for processing. For example, a titanium (Ti) layer between a silicon dioxide ($SiO_2$) dissolvable support and an aluminum (Al) part. Thus, the sequence of materials can be Al/Ti/$SiO_2$/Ti/Al. Titanium provides good adhesion promoter for both aluminum and silicon dioxide and will be dissolved by hydrogen fluoride (HF) in a liquid or vapor to form titanium tetrafluoride ($TiF_4$).

FIG. 6 shows a titanium alloy, Ti-6Al-4V, that has a sensitized layer that is subsequently dissolved. In one exemplary embodiment, the titanium alloy is sulfidized or sensitized in a tube furnace at an elevated temperature of between approximately 750 and 1150° C. for a time period between approximately 4 and 36 hours. The terms "approximately" or "substantially" can imply a variation of +/−10% on a relative basis. In various embodiments, the elevated temperature is between approximately 600 and 1300° C., or greater than approximately 600° C. In some embodiments, the time period is between approximately 2 and 48 hours, or greater than approximately 2 hours. Within the tube furnace, the source of sulfur is sulfur flake at a temperature of approximately 150° C., and argon gas flows through the tube furnace at a rate of 0.45 SLPM (1 scfh). The resulting depth of a sensitized region of titanium sulfide in the part is between approximately 10 and 200 μm. In various embodiments, the depth is between approximately 25 and 100 μm. In some embodiments, the depth is greater than approximately 10 μm.

It will be appreciated that the parameters used during the sensitizing of the part can be varied to produce different results. For example, the temperature and/or time period can be increased to produce a sensitized region with a greater depth. The parameters can be varied to change the processing time, the surface roughness, feature resolution, etc. Moreover, the sensitizing agent can be one or more of sulfur, phosphorus, or selenium in various embodiments, and the sensitizing agent can be in a solid, liquid, or vapor phase. In addition, the sensitizing agent can be delivered in elemental form or in a complex (e.g., sulfur or nickel sulfide) or a mixture, and the sensitized agent can be applied in a combination or sequence of phases or elements.

Next, an etchant is applied to the sensitized region to dissolve the sensitized region. In some embodiments, the etchant is a mixture of 5 M sulfuric acid ($H_2SO_4$) and 0.5 M sodium molybdate ($MoNa_2O_4$), and the etchant is applied to the sensitized region for a time period of approximately 19 hours to sufficiently dissolve the sensitized region but not the part. In some embodiments, the time period is between approximately 16 and 24 hours, or greater than approximately 16 hours.

In another embodiment, the sensitizing agent includes sulfur to sensitize, treat, and/or alter the surface of the metal part. The sulfur reacts with titanium of the metal part to form titanium disulfide ($TS_2$) and/or titanium-depleted areas in a region to a predetermined depth of the metal part. The titanium disulfide is soluble in dilute acids and concentrated acids. Additionally, differences in the diffusion rate of the various elements within the titanium alloy result in variations in the composition near the surface of a sulfurized titanium alloys. These post-sulfurized composition differences near the surface can be exploited to selectively dissolve the sensitized region under conditions that do not dissolve material of the metal part that are not sensitized by the sulfur of the sensitizing agent. In one embodiment, the sensitizing agent includes one or more of sulfur, $H_2S$, sulfates, $H_2SO_4$, and sulfides. The sensitizing agent can also include phosphorous and/or selenium.

In addition to dissolving a sensitized layer to separate a part and a support, the dissolution can reduce a surface roughness of the part. The roughness of a surface can be expressed in terms of a Ra parameter or arithmetical mean deviation of the assessed profile having the formula of $$R_a = \frac{1}{l_r} \int_0^{l_r} |z(x)| dx$$

where $l_r$ is the total horizontal length of the analyzed surface profile, and z is the vertical component of the surface and x is the horizontal component of the surface. The resulting Ra parameter has a dimension typically in μm. In the example shown in FIG. 6, the sensitizing and dissolving treatment reduced the Ra parameter from approximately 11 µm to approximately 7 µm. It will be appreciated any other surface roughness parameter can be used, and in generally terms, embodiment of the present disclosure can reduce the surface roughness to a smaller value.

This process described herein can be applied to other metal alloys such as copper alloys. In one embodiment, a process according to the present disclosure is applied to a copper alloy. In one embodiment, a sensitizing agent is applied to an outer surface of the copper at an elevated temperature between approximately 125 and 400° C. for a time period between 0.25 and 1.5 hours. In some embodiments, the elevated temperature is between approximately 100 and 500° C., or greater than approximately 100° C. In various embodiments, the time period is between approximately 0.15 and 3 hours, or greater than approximately 0.15 hours. In some embodiments, the copper material is dipped into the sensitizing agent, which is in a liquid state. In other embodiments, the sensitizing agent in a vapor state flows over the copper material. The sensitizing agent can be sulfur or nickel sulfide, and the resulting sensitized region of the part is copper sulfide.

Next, an etchant is applied to the sensitized region to remove the sensitized region. In one embodiment, the etchant is a mixture of 2 M nitric acid and a corrosion inhibitor such as 3-amino-1,2,4-triazole. This mixture dissolves the layer of copper sulfide but not the part made of copper or copper alloy. While a chemical process is described for removing the sensitized region, it will be appreciated that other processes such as vibratory polishing, scrapping, and electrochemical can remove or help remove the sensitized region. For electrochemical processes, the above-described chemical process can be combined with an electrical potential that passivates the underlying material. In addition, a corrosion inhibitor can be added to the electrolyte to further control process outputs such as surface roughness or etch time. The pH and electrolyte concentration can also be adjusted statically and dynamically to adjust process outputs.

In some embodiments, aluminum or copper can be sensitized with magnesium to create a more unstable sensitized region. The magnesium diffuses in material of the metal part to form a magnesium-rich alloy in a region near the surface of the metal part. The sources of magnesium can be magnesium, magnesium chloride, and other magnesium salts. The sensitized region can be dissolved by an etchant such as sodium chloride (NaCl), hydrogen chloride (HCl), other chloride-containing solutions, or acids.

Again, various parameters described herein can be varied to change the processes described herein as well as the resulting surface of the part. For example, changing one or more of the sulfur source, the elevated temperature and/or time period for the heat treatment and sensitizing, concentrations of nitric acid and/or corrosive inhibitor, and electrochemical parameters such as electric potential, current, and/or frequency can change the processing time, depth of removal, the surface roughness and the post-etch cleanliness of the part.

The description of the present disclosure has been presented for purposes of illustration and description, but is not intended to be exhaustive or limiting of the disclosure to the form disclosed. Many modifications and variations will be apparent to those of ordinary skill in the art. The embodiments described and shown in the figures were chosen and described in order to best explain the principles of the disclosure, the practical application, and to enable those of ordinary skill in the art to understand the disclosure.

While various embodiments of the present disclosure have been described in detail, it is apparent that modifications and alterations of those embodiments will occur to those skilled in the art. Moreover, references made herein to "the present disclosure" or aspects thereof should be understood to mean certain embodiments of the present disclosure and should not necessarily be construed as limiting all embodiments to a particular description. It is to be expressly understood that such modifications and alterations are within the scope and spirit of the present disclosure, as set forth in the following claims.

What is claimed is:

1. A process for separating a support from a part, comprising:
joining said part and said support at a connection that has a separation dimension from an outer perimeter of said connection;
applying a sensitizing agent to said part and said support proximate to said connection;
heating said part and said support at an elevated temperature to cause said sensitizing agent to diffuse into said part and said support and create a sensitized region, wherein said sensitized region has a depth that is greater than or equal to said separation dimension; and
applying an etchant to said sensitized region to dissolve said sensitized region through said separation dimension to separate said support from said part,
wherein said support, said connection, and said part are formed of the same material.

2. The process of claim 1, wherein said part and said support at least partially comprise one of an aluminum material or a copper material, said sensitizing agent at least partially comprises a magnesium material, and said etchant at least partially comprises a chloride material.

3. The process of claim 1, wherein said part and said support at least partially comprise a titanium material, said sensitizing agent at least partially comprises a sulfur material, and said etchant at least partially comprises at least one of sulfuric acid and sodium molybdate.

4. The process of claim 1, wherein said part and said support at least partially comprise a copper material, said sensitizing agent at least partially comprises a sulfur material, and said etchant at least partially comprises at least one of nitric acid and 3-amino-1,2,4-triazole.

5. The process of claim 1, wherein said connection has a cross section with a circular shape, and said separation dimension is a radius of said circular shape.

6. The process of claim 1, wherein applying said etchant is a self-terminating process such that only said sensitized region is dissolved or a rate of dissolution decreases after said sensitized region is dissolved.

7. The process of claim 1, further comprising
joining said part and a second support at a second connection that has a second separation dimension from an outer perimeter of said second connection, wherein said second separation dimension is larger than said separation dimension, and said sensitized region has a depth that is greater than or equal to said second separation dimension such that dissolution of said sensitized region separates said second support from said part.

8. The process of claim 7, wherein at least one of said elevated temperature, a time period for said heating, and a time period for said etching is increased to increase said depth of said sensitized region.

9. The process of claim 3, wherein causing said sensitizing agent to diffuse into said part causes an outer surface of said part and said support at the sensitized region to change from the titanium material to titanium disulfide.

10. A process for separating a support from a part, comprising:
- joining said part and said support at a connection that has a separation dimension from an outer perimeter of said connection, wherein said part, said connection, and said support comprises a titanium material;
- applying a sensitizing agent to said part and said support proximate to said connection, wherein said sensitizing agent comprises a sulfur material;
- heating said part and said support at an elevated temperature to cause said sensitizing agent to diffuse into said part and said support and create a sensitized region, wherein said sensitized region has a depth that is greater than or equal to said separation dimension, and wherein causing said sensitizing agent to diffuse into said part causes an outer surface of said part and said support at the sensitized region to change from the titanium material to titanium disulfide; and
- applying an etchant to said sensitized region to dissolve said sensitized region through said separation dimension to separate said support from said part.

11. The process of claim 10, wherein said support and said part are formed of the same material.

12. The process of claim 10, wherein said etchant at least partially comprises at least one of sulfuric acid and sodium molybdate.

13. The process of claim 10, wherein said connection has a cross section with a circular shape, and said separation dimension is a radius of said circular shape.

14. The process of claim 10, wherein applying said etchant is a self-terminating process such that only said sensitized region is dissolved or a rate of dissolution decreases after said sensitized region is dissolved.

15. The process of claim 10, further comprising
- joining said part and a second support at a second connection that has a second separation dimension from an outer perimeter of said second connection, wherein said second separation dimension is larger than said separation dimension, and said sensitized region has a depth that is greater than or equal to said second separation dimension such that dissolution of said sensitized region separates said second support from said part.

16. The process of claim 15, wherein at least one of said elevated temperature, a time period for said heating, and a time period for said etching is increased to increase said depth of said sensitized region.

17. A process for separating a support from a part, comprising:
- joining said part and said support at a connection that has a separation dimension from an outer perimeter of said connection, wherein said part, said connection, and said support comprises a copper material;
- applying a sensitizing agent to said part and said support proximate to said connection, wherein said sensitizing agent comprises a sulfur material;
- heating said part and said support at an elevated temperature to cause said sensitizing agent to diffuse into said part and said support and create a sensitized region, wherein said sensitized region has a depth that is greater than or equal to said separation dimension, and wherein causing said sensitizing agent to diffuse into said part causes an outer surface of said part and said support at the sensitized region to change from the copper material to copper sulfide; and
- applying an etchant to said sensitized region to dissolve said sensitized region through said separation dimension to separate said support from said part.

18. The process of claim 17, wherein said support and said part are formed of the same material.

19. The process of claim 17, wherein said etchant at least partially comprises at least one of nitric acid and 3-amino-1,2,4-triazole.

20. The process of claim 17, wherein said connection has a cross section with a circular shape, and said separation dimension is a radius of said circular shape.

* * * * *